United States Patent
Ishizue et al.

(10) Patent No.: US 8,368,262 B2
(45) Date of Patent: Feb. 5, 2013

(54) MOTOR

(75) Inventors: Ikuhito Ishizue, Tokyo (JP); Takuhiro Kondo, Tokyo (JP); Naoto Natsume, Kosai (JP); Masayuki Echizen, Kosai (JP)

(73) Assignee: Kayaba Industry Co., Ltd., Tokyo (JP)

( * ) Notice: Subject to any disclaimer, the term of this patent is extended or adjusted under 35 U.S.C. 154(b) by 283 days.

(21) Appl. No.: 12/726,663

(22) Filed: Mar. 18, 2010

(65) Prior Publication Data

US 2010/0237721 A1 Sep. 23, 2010

(30) Foreign Application Priority Data

Mar. 23, 2009 (JP) ................................ 2009-070412

(51) Int. Cl.
*H02K 1/04* (2006.01)
(52) U.S. Cl. .......................................... 310/43; 310/71
(58) Field of Classification Search ................ 310/43, 310/71, 87, 89
See application file for complete search history.

(56) References Cited

U.S. PATENT DOCUMENTS

| 6,166,143 | A | * | 12/2000 | Watanabe et al. | 525/208 |
| 6,879,071 | B2 | * | 4/2005 | Kanazawa et al. | 310/71 |
| 7,084,547 | B2 | * | 8/2006 | Moroto et al. | 310/233 |
| 2003/0230945 | A1 | * | 12/2003 | Okubo et al. | 310/112 |

FOREIGN PATENT DOCUMENTS

| JP | 2004-40852 | | 2/2004 |
| JP | 2004-40853 | * | 2/2004 |

* cited by examiner

*Primary Examiner* — Nguyen N Hanh
(74) *Attorney, Agent, or Firm* — McGlew and Tuttle, P.C.

(57) ABSTRACT

The present invention provides a motor (M) including a case (1) storing an armature (3) having a winding wire (2) wound thereon on the inner circumferential side, in which the case (1) includes an opening part (1a) for inserting a terminal (5) for connecting the winding wire (2) to an external power source, and the terminal (5) is integrated into a resin for forming a cap (6) for air-tightly closing the opening part (1a) by insert molding, with one end (5a) of the terminal (5) being protruded into the case (1) and the other end (5b) of the terminal (5) being protruded out of the case (1).

20 Claims, 2 Drawing Sheets

MOTOR

FIELD OF THE INVENTION

The present invention relates to improvements of a motor.

DESCRIPTION OF THE RELATED ART

Generally, a motor is adapted to be connectable to a power source set outside through a lead wire extending out of a case since it requires supply of current to a winding wire of an armature. Since such a motor involves the risk of penetration of water into the case through the circumference of the lead wire when applied to a device for outdoor use such as an automobile, a waterproof structure must be adapted for this portion to prevent the penetration of water to the inside, although the motor can be safely applied to a device free from internal penetration of water.

As a motor which achieved the waterproof structure, for example, a motor disclosed in Japanese Patent Application Laid-Open No. 2004-40852 comprises a cylindrical case storing an armature and a magnetic field, a rotor rotatably inserted into the case and protruded outward from one end thereof, and a cap fitted to an opening part at the other end of the case, in which the cap is made of resin and includes a through hole allowing insertion of a terminal for carrying current to the winding wire of the armature and a cylindrical coupler which covers the outer circumference of the terminal protruded outwardly through the through hole.

The cap further holds a sensor for detecting a rotating position of the rotor, a sensor terminal connected to the sensor is embedded in the cap, and the outer circumference of the sensor terminal protruding outwardly is covered with a cylindrical sensor coupler.

In the thus-constituted motor in which an external power source or a control device is connected to the winding wire and the sensor so that power feeding can be performed thereto by connecting a coupler provided at the top end of a lead wire extended from the external power source or the like to the coupler and the sensor coupler provided on the cap, sure waterproofing can be achieved since the cap is fitted to the opening part of the motor to close it, the cap is provided with the coupler and the sensor coupler integrated by a mold resin, and the terminal and the sensor terminal are protruded respectively into the coupler and into the sensor coupler through the mold resin.

DISCLOSURE OF THE INVENTION

Although the motor disclosed in Japanese Patent Application Laid-Open No. 2004-40852 is excellent in the point that it can be adapted to an automobile or the like since the penetration of water into the motor can be prevented, it has the following problems.

That is, since the terminal of the winding wire is inserted into the cap in such a conventional motor, the motor cannot be maintained in an internally airtight state, particularly, in a case such that the motor itself is used as a pressure vessel due to high internal pressure of a device to which the motor is installed, and the motor cannot be thus used for a purpose needing the internal air-tightness.

Further, although the sensor terminal is coated with a cord, the cord is not sealed to a conductor within the cord, and a clearance may be formed also between the cord and the mold resin without melting of the cord depending on the temperature or pressure in injection of the mold resin into a die or the difference in material between the cord and the cap made of resin. This disables to ensure the internal air-tightness of the motor.

In order to improve the above-mentioned problems, the present invention thus has an object to provide a motor capable of maintaining the internal air-tightness.

That is, the present invention provides a motor including a case storing an armature having a winding wire wound thereon on the inner circumferential side, in which the case includes an opening part for inserting a terminal for connecting the winding wire to an external power source, and the terminal is integrated into a resin for forming a cap for airtightly closing the opening part by insert molding, with one end of the terminal being protruded into the case, and the other end of the terminal being protruded out of the case.

According to the motor of the present invention, since the terminal is integrated into the cap for closing the opening part by insert molding, the inside of the case can be maintained in an airtight state without leak of the pressure within the motor through the circumference of the terminal even when the motor is used as a pressure vessel.

Further, the integration of the terminal into the cap by insert molding allows the opening part of the case to be air-tightly closed by a simple structure of only installing a seal ring to the outer circumference without the need to seal the circumference of the terminal, and the number of part items can be reduced. Further, good assembling property thereof allows reduction in workload as well as reduction in manufacturing cost, and the motor can be reduced in size as no seal is set around the terminal.

Further, the integration of the terminal into the cap by insert molding allows the terminal to be sealed without making it into a circular sectional shape since the sealing of the circumference of the terminal is dispensed with. Therefore, the flexibility of design of the terminal can be improved. For example, the space for terminal within the case can be reduced by forming the terminal into a flat sheet shape, compared with a terminal having a circular sectional shape, and this is also contributable to the reduction in size of the motor.

MODE FOR CARRYING OUT THE INVENTION

Figure 1:
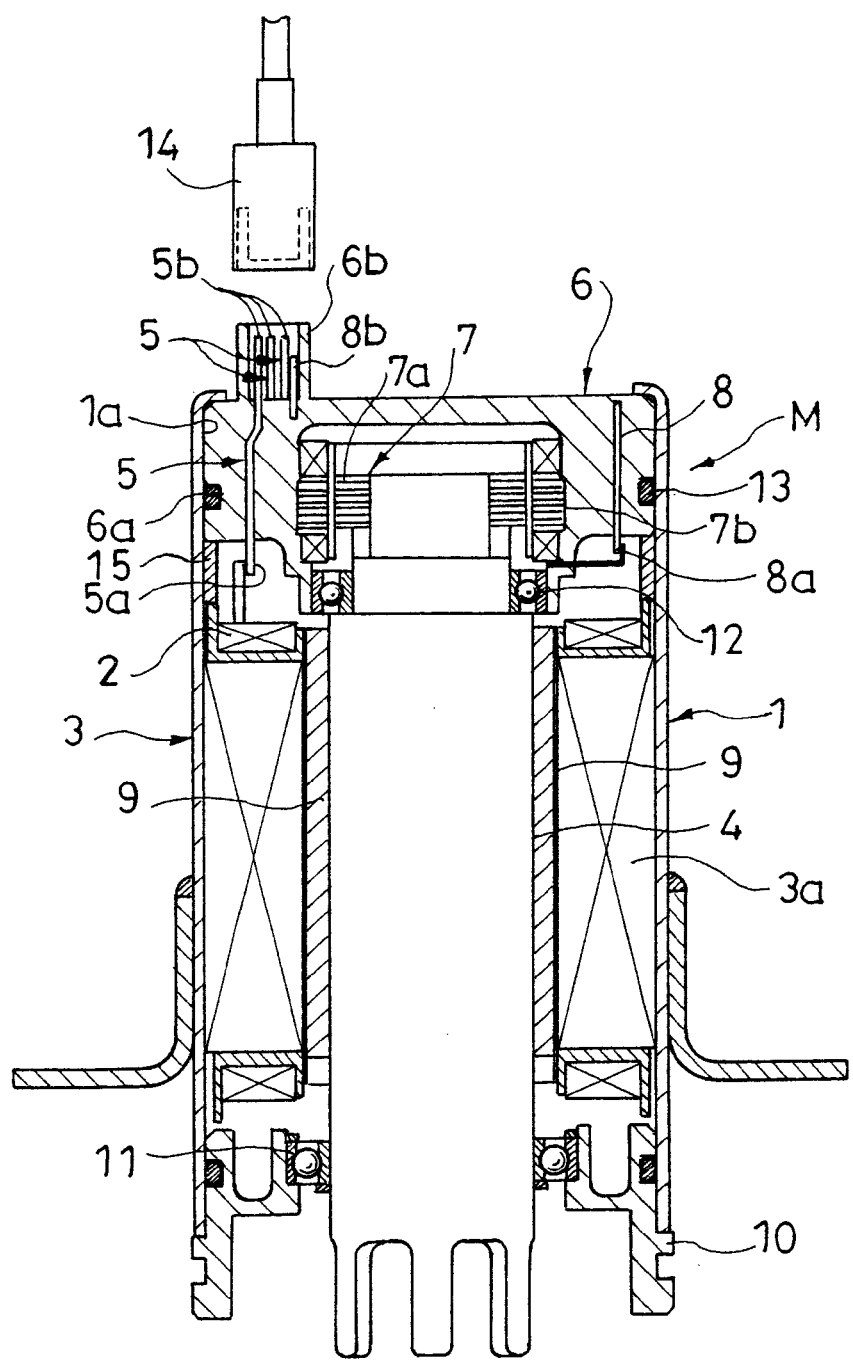
FIG. 1 is a vertical sectional view of a motor according to one embodiment of the present invention.

The present invention will be further described based on an embodiment shown in the drawings. As shown in FIG. 1, a motor M in one embodiment comprises a cylindrical case 1 storing an armature 3 having a winding wire 2 wound thereon on the inner circumferential side; a rotor 4 rotatably inserted into the case 1 and protruded from the lower end side in FIG. 1 that corresponds to one end of the case 1; a terminal 5 for connecting the winding wire 2 to an external power source out of the drawing; a cap 6 for air-tightly closing an opening part 1a at the upper end in FIG. 1 that corresponds to the other end of the case 1 through which the terminal 5 is inserted; a sensor 7 for detecting a rotating position of the rotor 4, which is held by the cap 6; and a sensor terminal 8 for connecting the sensor 7 to the external power source out of the drawing, the terminal 5 and the sensor terminal 8 being integrated into a resin for forming the cap 6 by insert molding.

Each part will be then described in detail. The case 1 is formed into a cylindrical shape as shown in FIG. 1, and stores the armature 3 having the winding wire 2 wound thereon which works as a stator, and the rotor 4 having a magnet 9 as a magnetic field installed to the outer circumference thereof.

The rotor 4 is pivotally supported by a ball bearing 11 held on the inner circumference of an annular bracket 10 fitted to the inner circumference at the lower end in FIG. 1 of the case 1 and a ball bearing 12 held by the cap 6 to be fitted to the upper end in FIG. 1 of the case 1 so as to be rotatable relative to the case 1.

The armature 3 includes a cylindrical core 3a having a plurality of slots and the winding wire 2 wound on each slot of the core 3a. The armature 3 is fixed to the inner circumference of the case 1.

In this motor M, the armature includes three-phase or U, V, and W-phase winding wires 2, and one terminal 5 is connected to each phase winding wire 2 so that the winding wire 2 is connected to the external power source through the corresponding terminal 5. That is, the motor M adapted so that power feeding can be performed to the winding wire 2 through the terminal 5 is constituted, for example, as a conventionally known three-phase brushless motor in which a stator that is the armature generates a rotary magnetic field by applying a sine wave voltage to three-phase or U, V and W-phase winding wires with a phase difference of 120°, and the magnet 9 that is the magnetic field rotationally drives the rotor 4 following it, and the terminal 5 is connected to the external power source through a motor driver circuit such as an inverter circuit for applying voltage to the winding wire 2 as described above.

In this embodiment, since the motor M constituted as the brushless motor requires detection of rotating position of the rotor 4 for controlling the current carrying to each winding wire 2, the motor M includes a sensor 7 for detecting the rotating position. The sensor 7 is concretely composed of a resolver, including a resolver rotor 7a installed to the outer circumference at the upper end in FIG. 1 of the rotor 4, and a resolver stator 7b held in a position opposed to the resolver rotor 7a by the cap 6.

The motor further comprises a sensor terminal 8 for carrying a current to the resolver stator 7b of the sensor 7 and taking out an output signal to the outside, and the resolver stator 7b is connected to the external power source and a controller out of the drawing which receives the output signal through the sensor terminal 8. The controller obtains the position of the rotor 4 from the output of the sensor 7, and controls the motor driver circuit to properly perform rotary drive of the motor M.

The cap 6 is formed into a bottomed cylindrical shape by use of a resin, and fixed to the case 1 by caulking the upper end of the case 1 while fitting the outer circumference thereof to the opening part 1a at the upper end in FIG. 1 of the case 1 to close the opening part 1a. For this caulking fixation, a cylindrical spacer 15 is interposed between the core 3a of the armature 3 and the cap 6 so that the cap 6 is fixed to the case 1 while being held between the spacer 15 and a caulking part (not shown) at the upper end of the case 1. The fixation of the cap 6 to the case 1 can be performed by a fixing method other than the caulking fixation typified by the above-mentioned method.

The cap 6 includes an annular groove 6a formed on the outer circumference, and an annular seal ring 13 is fitted into the annular groove 6a to closely seal a space between the cap 6 and the opening part 1a of the case 1. The cap 6 further includes a cylindrical connector 6b at the upper end so as to be connectable to an external connector 14 provided at the top end of lead wires extended from the external power source and the controller out of the drawing.

The cap 6 further holds the resolver stator 7b and the ball bearing 12 on the inner circumference, rotatably supports the upper end in FIG. 1 of the rotor 4, and also works as a sensor holder.

Additionally, the cap 6 is embedded with the bar-like terminal 5 and the sensor terminal 8, with one-side ends 5a and 8a that correspond to the lower ends in FIG. 1 of the terminal 5 and the sensor terminal 8 being protruded into the case 1, and the other ends 5b and 8b that correspond to the upper ends in FIG. 1 thereof being protruded into the connector 6b so as to face the outside of the case.

When the connector 6b is connected to the external connector 14, the other end 5b of the terminal 5 is connected to a terminal not shown to be connected to the external power source, which is provided within the external connector 14, and the other end 8b of the sensor terminal 8 is also connected to a terminal not shown to be connected to the external power source and the controller of the external connector 14 similarly to the terminal 5.

The terminal 5 and the sensor terminal 8 are integrated into a resin for forming the cap 6 by insert molding. In detail, the outer circumference of the terminal 5 and the sensor terminal 8 is surrounded with the resin by performing insert molding of preliminarily inserting the terminal 5 and the sensor terminal 8 within a die for molding the cap 6 and injecting the heated and pressurized resin into the die, whereby the inside of the case 1 can be maintained in an airtight state without causing any clearance between the cap 6 and the terminal 5 or the sensor terminal 8.

When a thermoplastic resin is used as the resin with an oxygenated hydrocarbon resin being mixed thereto, and the melted resin is brought into contact with a metallic product, adhesion of metal and resin can be performed, and the air-tightness can be improved using this adhesive effect. That is, when the adhesion of metal and resin is performed by the insert molding of inserting the metallic terminal 5 and sensor terminal 8 into the die and injecting the melted thermoplastic resin into the die by use of the thermoplastic resin having the oxygenated hydrocarbon resin as the material of the cap 6, peeling of the metal from the resin is never caused. Therefore, the air-tightness of the case 1 can be improved.

The adhesion between the metal and the resin can be more strengthened by surface-treating the terminal 5 and the sensor terminal 8 which are made of metal with a triazine thiol compound prior to the insert molding, whereby the air-tightness of the case 1 can be further improved. In this case, a resin other than the thermoplastic resin may be used.

The selection of the thermoplastic resin and the oxygenated hydrocarbon resin to be mixed thereto, the procedure for the surface treatment of metal with the triazine thiol compound, or the like can be performed according to a method and a procedure described, for example, in Japanese Patent Application Laid-Open No. Hei11-58604 and Japanese Patent Application Laid-Open No. 2001-1445.

Since the cap 6 is made of resin, and integrated into the terminal 5 and the sensor terminal 8 by the insert molding, the case 1 can be maintained in an airtight state, even when the motor M is used as the pressure vessel, without leak of the pressure within the motor through the circumference of the terminal 5 and the sensor terminal 8.

Since the terminal 5 and the sensor terminal 8 are integrated into the cap 6 by the insert molding, the opening part 1a of the case 1 can be air-tightly closed by a simple structure of only installing the seal ring 13 to the outer circumference without the need to seal the circumference of the terminal 5 and the sensor terminal 8, and the number of part items can be thus reduced. Further, good assembling property thereof allows reduction in workload as well as reduction in manufacturing cost, and the motor M can be reduced in size as no seal is set around each of the terminals 5 and 8.

Further, the integration of the terminal 5 and the sensor terminal 8 into the cap 6 by the insert molding allows the terminal 5 or the sensor terminal 8 to be sealed without forming the terminal 5 or the sensor terminal 8 into a circular sectional shape since the sealing of the circumference of the terminal 5 and the sensor terminal 8 is dispensed with. Therefore, the flexibility of design of the terminal 5 and the sensor terminal 8 can be improved. For example, the space for the terminal 5 and the sensor terminal 8 within the case 1 can be reduced by forming the terminal 5 and the sensor terminal 8 into a flat sheet shape, compared with those having a circular sectional shape, and this is also contributable to the reduction in size of the motor M.

Although the three-phase brushless motor having three terminals 5 protruded out of the case 1 is adapted in this embodiment, the number of terminals may be set to a necessary number according to the number of corresponding winding wires. Further, although the resolver is used as the sensor 7 for detecting the position of the rotor 4, another sensor such as a Hall element may be used, and when the motor M is a motor with brush which does not require setting of the sensor, only the terminal 5 for current-carrying to the winding wire 2 can be integrated into the cap 6 by insert molding.

Figure 2:
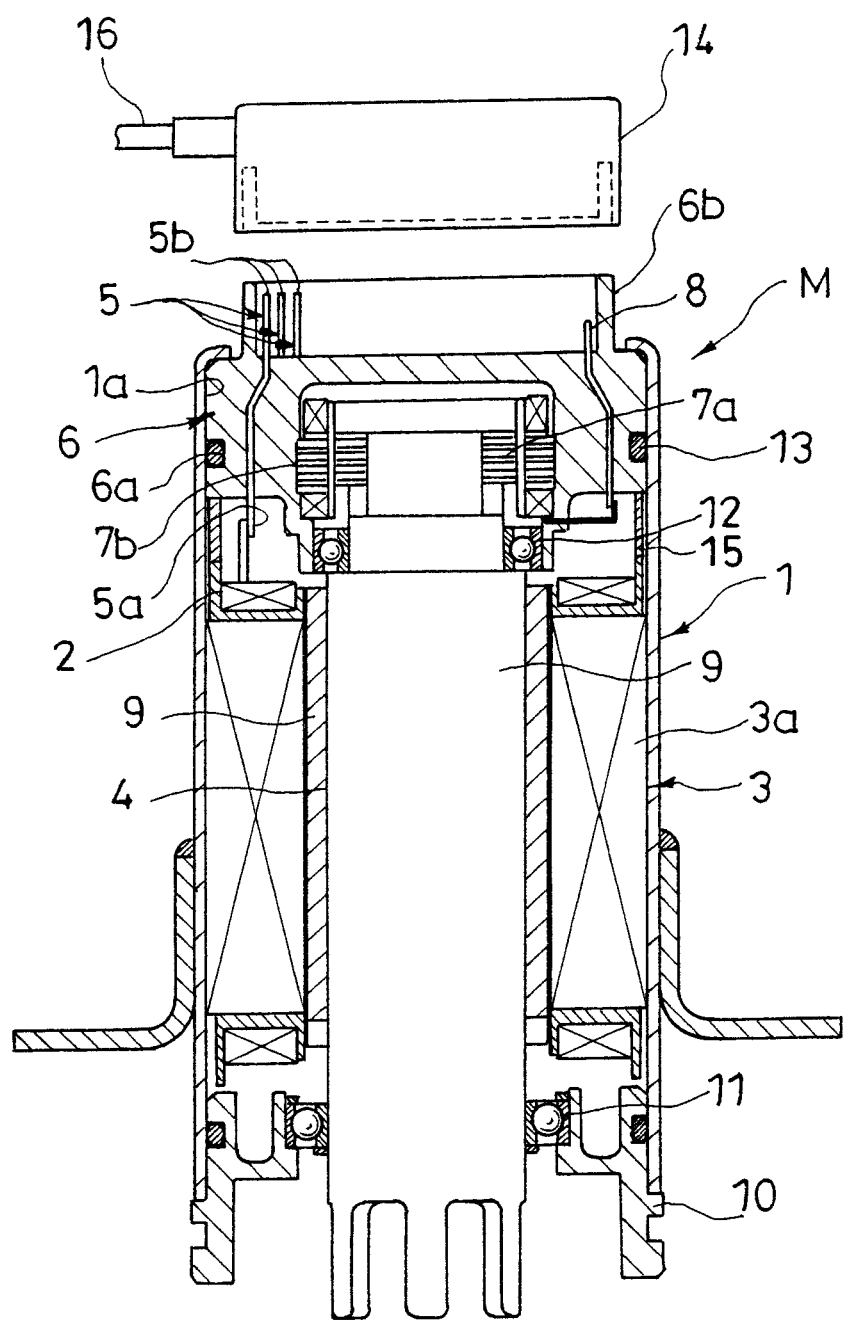
FIG. 2 is a vertical sectional view of a motor according to one modified example of the one embodiment.

Further, although the terminal 5 protruded out of the case 1 and the sensor terminal 8 connected to the sensor 7 are protruded into the single connector 6b, connectors for power source and for sensor may be separately provided, or a cylindrical connector 6b may be provided, as shown in FIG. 2, on the outer circumference of the upper end in FIG. 2 of the cap 6 so that a harness 16 storing a lead wire extends laterally relative to the external connector 14. In this way, the shape, size and structure of the connector 6b can be appropriately changed in design depending on restrictions by the mounting space or mounting position of the motor M.

In this embodiment, although the case 1 has a cylindrical shape with an opening part at the upper end, the opening part of the case may be provided laterally in the case. In addition, since the cap 6 serves as both the sensor holder and the holder for holding the ball bearing, the number of part items can be reduced without the need to separately provide the sensor holder or the like. However, the sensor holder or the holder for holding the ball bearing can be separately provided.

It is obvious that the scope of the present invention is never limited by details shown by the drawings or described.

INDUSTRIAL AVAILABILITY

The present invention can be applied to a motor.

The invention claimed is:

1. A motor, comprising:
a case storing a rotor and an armature having a winding wire wound thereon on an inner circumferential side, wherein the case comprises an opening part for inserting a terminal for connecting the winding wire to an external power source, and the terminal is integrated into a resin, said resin forming a cap for air-tightly closing the opening part by insert molding, with one end of the terminal being protruded into the case and another end of the terminal being protruded out of the case, said cap having a resin inner cap surface, said resin inner cap surface defining a rotor portion receiving opening, at least a portion of said rotor being arranged in said rotor portion receiving opening;
a sensor for detecting a rotating position of the rotor, at least a portion of said sensor engaging at least a portion of said resin inner cap surface.

2. The motor according to claim 1, wherein the terminal is surface-treated with a triazine thiol compound, and then integrated into the resin by insert molding.

3. The motor according to claim 2, wherein the case has a cylindrical shape, and the cap closes the opening part at one end of the case and holds a ball bearing for rotatably supporting an end of the rotor.

4. The motor according to claim 3, further comprising:
a sensor terminal for connecting the sensor to the external power source, said sensor terminal being integrated into the cap by insert molding, with one end of the sensor terminal being protruded into the case and another end of the sensor terminal being protruded out of the case.

5. The motor according to claim 2, further comprising:
a sensor terminal for connecting the sensor to the external power source, said sensor terminal being integrated into the cap by insert molding, with one end of the sensor terminal being protruded into the case and another end of the sensor terminal being protruded out of the case.

6. The motor according to claim 1, wherein the case has a cylindrical shape, and the cap closes the opening part at one end of the case and holds a ball bearing for rotatably supporting an end of the rotor, said sensor including a rotor stator and a rotor resolver, said rotor resolver engaging said resin inner cap surface, said rotor stator engaging said end of said rotor, said end of said rotor being arranged in said rotor portion receiving opening, said ball bearing engaging said resin inner cap surface, said ball bearing being located at a position below said rotor stator and said rotor resolver.

7. The motor according to claim 6, further comprising:
a sensor terminal for connecting the sensor to the external power source, said sensor terminal being integrated into the cap by insert molding, with one end of the sensor terminal being protruded into the case and the other end of the sensor terminal being protruded out of the case.

8. The motor according to claim 6, wherein said comprises a longitudinal axis, said resin inner cap surface comprising a first resin inner cap surface, a second resin inner cap surface and a third resin inner cap surface, said first resin inner cap surface and said third resin inner cap surface being parallel to said longitudinal axis, said second resin inner cap surface being substantially perpendicular to said longitudinal axis, said first resin inner cap surface and said second resin inner cap surface engaging said resolver stator, said third resin inner cap surface engaging said ball bearing.

9. The motor according to claim 6, further comprising:
a connector structure comprising a connector receiving recess and a first cap terminal, said cap comprising a resin connector portion, said connector receiving recess receiving at least a portion of said resin connector portion, wherein said resin connector portion engages said connector structure, said first cap terminal being connected to the external power source, said terminal engaging said first cap terminal.

10. The motor according to claim 9, wherein said another end of said terminal has a height that is less than a height of said resin connector portion.

11. The motor according to claim 1, further comprising:
a sensor terminal for connecting the sensor to the external power source, said sensor terminal being integrated into the cap by insert molding, with one end of the sensor terminal being protruded into the case and another end of the sensor terminal being protruded out of the case.

12. The motor according to claim 1, further comprising:
an annular flange connected to said casing, said annular flange being arranged opposite said armature.

13. A motor, comprising:
a case comprising an opening part;
an armature having a winding wire wound on an inner circumferential side thereof;
a rotor comprising a longitudinal rotor axis;
an electrical connector inserted in said opening part, said electrical connector connecting said winding wire to an external power source;
a resin cap sealing said opening part, at least a portion of said electrical connector engaging said resin cap, one end of said electrical connector extending into said case and another end of said electrical connector extending to a position outside of said case, said cap having a resin inner cap surface, said resin inner cap surface comprising a first resin inner cap surface portion parallel to said longitudinal axis;
a sensor for detecting a rotating position of the rotor, at least a portion of said sensor engaging said first resin inner cap surface portion.

14. The motor according to claim 13, wherein said sensor comprises a resolver rotor and a resolver stator, said resolver rotor engaging at least an outer circumferential portion of said rotor, said resolver stator comprising a first outer side resolver stator surface and a second outer side resolver stator surface, said first outer side resolver stator surface being substantially perpendicular to said second outer side resolver stator surface, said first resin inner cap surface portion engaging said first outer side resolver stator surface, said resin inner cap surface comprising a second resin inner cap surface portion, said second resin inner cap surface portion being substantially perpendicular to said longitudinal rotor axis, said second resin inner cap surface portion engaging said second outer side resolver stator surface.

15. The motor according to claim 14, further comprising:
a second connector comprising a second connector first end and a second connector second end, said second connector first end being connected to said sensor, at least said second connector first end engaging said cap;
a connector structure comprising a resin connector receiving recess and a connector structure terminal, said cap comprising a resin connector portion at one end thereof, said resin connector receiving recess receiving at least a portion of said resin connector portion, wherein said resin connector portion engages said connector structure, said connector structure terminal being connected to a power source.

16. The motor according to claim 15, wherein said resin connector portion has a height that is greater than a height of one end of said electrical connector extending to a position outside of said casing.

17. The motor according to claim 14, further comprising:
a bearing structure, said sensor comprising a resolver stator and a resolver rotor, said resolver rotor engaging said resin inner cap surface, said resolver stator engaging one end of said rotor, said resin inner cap surface defining a rotor portion receiving opening, said one end of said rotor being arranged in said rotor portion receiving opening, said bearing structure engaging said resin inner cap surface, said bearing structure being located at a position below said rotor stator and said rotor resolver.

18. A motor, comprising:
a case comprising an opening part;
an armature having a winding wire wound on an inner circumferential side thereof, said armature being arranged in said case;
a rotor, at least a portion of said rotor being arranged in said case;
an electrical connector inserted in said opening part;
a resin cap sealing said opening part, at least a portion of said electrical engaging said resin cap, one end of said electrical connector extending to a position inside said case and another end of said electrical connector extending to a position outside of said case, said one end of said electrical connector being connected to said winding wire, said cap having a resin inner cap surface comprising a first resin inner cap surface portion and a second resin inner cap surface portion, said second resin inner cap surface portion being perpendicular to said first resin inner cap surface portion;
a sensor for detecting a rotating position of the rotor, said first resin inner cap surface portion and said second resin inner cap surface portion engaging at least a portion of said sensor.

19. The motor according to claim 18, further comprising:
a bearing structure, said rotor comprising a longitudinal rotor axis, said first resin inner cap surface portion being parallel to said longitudinal axis, said second resin inner cap surface being substantially perpendicular to said longitudinal rotor axis, said rotor comprising an upper end portion, said bearing structure engaging said upper end portion, said bearing structure comprising an outer bearing structure side surface, said outer bearing structure side surface engaging said resin inner cap surface;
a connector structure comprising a connector receiving recess and a connector structure terminal, said cap comprising a resin connector portion, said resin connector receiving recess receiving at least a portion of said resin connector portion, wherein said resin connector portion engages said connector structure, said connector structure being connected to a power source.

20. The motor according to claim 19, wherein said sensor comprises a resolver rotor and a resolver stator, said resolver rotor engaging at least an outer circumferential end portion of said rotor, said resolver stator comprising a sensor side surface and a sensor lower surface, said sensor side surface engaging said first resin cap inner surface portion, said sensor lower surface engaging said second resin cap inner surface portion, wherein said another end of said electrical connector has a height that is less than a height of said resin connector portion, said resolver stator being located at a position above said bearing structure, said resin inner cap surface defining a rotor portion receiving opening, said outer circumferential end portion of said rotor being arranged in said rotor portion receiving opening.

* * * * *